United States Patent
Heinebrodt et al.

(10) Patent No.: US 9,004,616 B2
(45) Date of Patent: Apr. 14, 2015

(54) BRAKE CONTROL SYSTEM FOR MOTOR VEHICLES

(75) Inventors: Martin Heinebrodt, Stuttgart (DE); Martin Randler, Immenstadt (DE)

(73) Assignee: Robert Bosch GmbH, Stuttgart (DE)

( * ) Notice: Subject to any disclaimer, the term of this patent is extended or adjusted under 35 U.S.C. 154(b) by 2075 days.

(21) Appl. No.: 10/592,204

(22) PCT Filed: Jan. 20, 2005

(86) PCT No.: PCT/EP2005/050225
§ 371 (c)(1),
(2), (4) Date: May 12, 2008

(87) PCT Pub. No.: WO2005/092682
PCT Pub. Date: Oct. 6, 2005

(65) Prior Publication Data
US 2011/0121642 A1    May 26, 2011

(30) Foreign Application Priority Data
Mar. 27, 2004    (DE) .......................... 10 2004 015 114

(51) Int. Cl.
*B60T 8/88*    (2006.01)

(52) U.S. Cl.
CPC ............. *B60T 8/885* (2013.01); *B60T 2201/02* (2013.01); *B60T 2270/402* (2013.01)

(58) Field of Classification Search
USPC .......................... 303/140, 146–150, 122, 193
See application file for complete search history.

(56) References Cited

U.S. PATENT DOCUMENTS

| | | | |
|---|---|---|---|
| 5,032,995 A * | 7/1991 | Matsuda et al. ............. 701/29.2 |
| 5,172,959 A * | 12/1992 | Eickhoff et al. ............... 303/190 |
| 5,418,727 A * | 5/1995 | Ikeda et al. ...................... 701/96 |
| 5,651,593 A * | 7/1997 | Shitani et al. .................. 303/190 |
| 6,056,374 A * | 5/2000 | Hiwatashi ....................... 303/193 |
| 6,062,659 A * | 5/2000 | Matsuda ....................... 303/160 |
| 6,205,391 B1 * | 3/2001 | Ghoneim et al. ............... 701/70 |
| 6,208,106 B1 | 3/2001 | Sielagoski et al. |
| 6,272,418 B1 * | 8/2001 | Shinmura et al. ............... 701/72 |
| 6,285,944 B1 * | 9/2001 | Tange et al. ..................... 701/96 |
| 6,304,808 B1 | 10/2001 | Milot |
| 6,357,839 B1 * | 3/2002 | Eckert ........................... 303/142 |
| 6,378,961 B1 * | 4/2002 | Hara et al. ..................... 303/193 |
| 6,505,893 B2 * | 1/2003 | Schmidt et al. .......... 303/122.09 |
| 6,623,089 B2 * | 9/2003 | Amberkar ...................... 303/146 |
| 6,902,241 B2 * | 6/2005 | Yamamoto et al. ........... 303/122 |
| 7,059,687 B2 * | 6/2006 | Yasui et al. ................. 303/113.5 |
| 7,648,212 B2 * | 1/2010 | Nishio et al. .................... 303/11 |
| 7,798,576 B2 * | 9/2010 | Sato et al. ....................... 303/10 |
| 7,871,135 B2 * | 1/2011 | Nishio et al. .................... 303/11 |
| 8,170,767 B2 * | 5/2012 | Meyers et al. .................. 701/78 |
| 2004/0262991 A1 * | 12/2004 | Anwar ........................... 303/147 |
| 2005/0012386 A1 * | 1/2005 | Nakano et al. ............. 303/114.1 |

FOREIGN PATENT DOCUMENTS

| | | |
|---|---|---|
| DE | 197 04 841 | 8/1998 |
| WO | WO 02/20296 | 3/2002 |

* cited by examiner

*Primary Examiner* — Robert A Siconolfi
*Assistant Examiner* — James Hsiao
(74) *Attorney, Agent, or Firm* — Kenyon & Kenyon LLP

(57) ABSTRACT

A brake control system for motor vehicles includes a stability system for stabilizing the vehicle from the standpoint of driving dynamics during braking, a triggering unit for the automatic output of a braking demand as a function of the traffic situation, a braking unit which converts the braking demand into a braking action, and a control unit for modifying the braking demand prior to its implementation as a function of the state of the stability system.

5 Claims, 2 Drawing Sheets

| ABS | ESP | μ | a' |
|---|---|---|---|
| 1 | 1 | — | a' = a |
| 1 | 0 | NN | a' = 0 |
| 0 | 1 | NN | a' = 0 |
| 0 | 0 | NN | a' = 0 |
| 1 | 0 | 1 | a' = min(a, alim1(μ)) |
| 0 | 1 | 1 | a' = min(a, alim2(μ)) |
| 0 | 0 | 1 | a' = min(a, alim3(μ)) |

BRAKE CONTROL SYSTEM FOR MOTOR VEHICLES

FIELD OF THE INVENTION

The present invention relates to a brake control system for motor vehicles, having a stability system for stabilizing the vehicle during braking.

BACKGROUND INFORMATION

For the most part, modern motor vehicles have an electronic stability system, e.g., ABS (anti-lock braking system) and/or ESP (electronic stability program) which provides for stabilization of the vehicle from the standpoint of driving dynamics, e.g., during braking, and thus assists the driver in guiding the vehicle. The driver is generally unable to either influence or override the actions of these stability systems.

On the other hand, there are assistance systems which assist the driver on another level in guiding the vehicle. Examples of such assistance systems are so-called ACC (adaptive cruise control) systems which permit automatic speed control and automatic distance control with respect to the preceding vehicle, warning systems which warn the driver of critical traffic situations, and pre-crash systems which, in the event of an imminent collision, automatically trigger actions for averting the collision or for lessening the collision results. To detect the traffic situation, these assistance systems generally have a surround field sensor system, e.g., in the form of radar sensors, video systems having electronic image processing and the like, and depending on the traffic situation sensed, variably intervene in the drive system and, if necessary, in the brake system of the vehicle, as well. In general, the driver is able to deactivate these systems and override their commands.

For the intervention in the brake system, the assistance systems have a triggering unit which, depending on the situation, outputs a braking demand that the vehicle braking unit then converts into the corresponding braking action. The intensity of the braking action can vary within a wide range, and extends from gentle braking actions for adjusting to the speed of the preceding vehicle, to brief warning brakings which serve as kinesthetic warning signal for the driver, right up to automatically triggered emergency brakings. During these braking actions, generally the driver at least retains control over the steering of the vehicle, so that the driver is able to undertake evasive maneuvers. In this context, if necessary, the stability system automatically provides for the dynamic stabilization of the vehicle, so that the vehicle does not get out of control.

SUMMARY

The present invention provides the advantage that the stability of the vehicle can be ensured when the assistance system is activated even if the functions of the stability system are not available, or are available to only a limited extent.

For this purpose, the brake control system of the present invention has a control unit which modifies the braking demand of the triggering unit, prior to its implementation, as a function of the state of the stability system.

If the stability system is not fully functional, the control unit thus assures that the braking demand is modified in such a way that the driving stability is nevertheless ensured. In this way, disturbances to comfort, and dangerous situations which could otherwise result due to the lack of vehicle stability, are avoided.

In an example case, the modification of the braking demand is completely suppressing the braking demand if the stability system or parts thereof are defective or inactive. Depending upon the type and the extent to which the stability system is functionally impaired, however, the braking demand may also be modified in a manner that the extent of the braking demand is limited to values at which there is no need to fear an adverse impact on stability.

One determining parameter for the stability of the vehicle is the coefficient of friction μ between the roadway and the tires. This coefficient of friction μ is normally ascertained within the scope of the function of an ABS system or ESP system. However, special sensors may also be provided, with which at least an estimate can also be obtained for the coefficient of friction μ independently of the function of the stability system. If an estimate is available for the coefficient of friction, one example modification of the braking demand is to limit the braking deceleration or the braking pressure, indicated implicitly by the braking demand, to a limiting value as a function of the coefficient of friction. This limiting value may also be a function of further state variables of the vehicle, e.g., driving speed V, the payload and the like.

The control unit for modifying the braking demand may be a component of the triggering unit or component of the braking unit; however, it may also be configured as a separate unit and connected via a communication device, e.g., a data bus, to the triggering unit and/or the braking unit.

DETAILED DESCRIPTION

Figure 1:
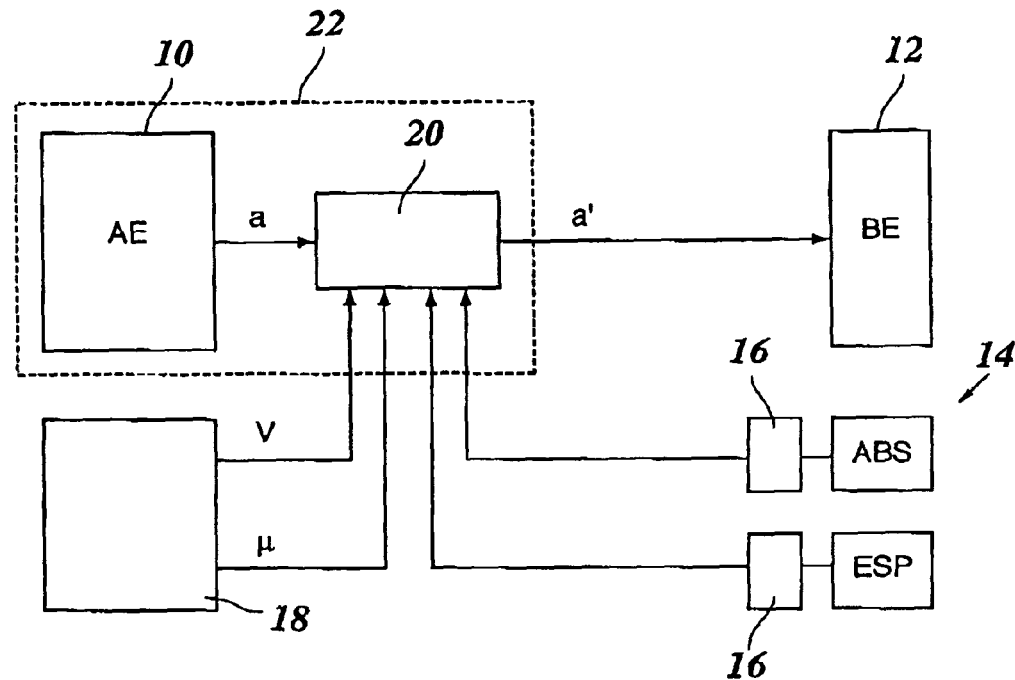
FIGS. 1 to 3 show block diagrams of different exemplary embodiments of the brake control system of the present invention.

The brake control system shown in FIG. 1 includes a triggering unit 10 and a braking unit 12 as main components. These units may be separate hardware components, or different program modules of an integrated electronic data-processing device. Triggering unit 10 may be formed, for instance, by an ACC system or any other assistance system which is able to intervene in the brake system of the vehicle, and to this end, to output a braking demand "a" to braking unit 12. Braking unit 12 then controls the braking force at the wheels of the vehicle according to this braking demand a. Braking demand a is thus a signal which quantitatively indicates the intensity of the braking intervention, e.g., in the form of a setpoint braking deceleration, a setpoint braking pressure or the like.

Also belonging to the brake control system is a stability system 14 which, in the example shown, includes two electronic regulating devices, ABS (anti-lock braking system) and ESP (electronic stability program). The anti-lock braking system ABS modulates the braking pressure at the wheels in such a way that the wheels are prevented from locking. The electronic stability program ESP evaluates the vehicle data in connection with driving dynamics, e.g., speed V, the transverse acceleration and/or yaw rate of the vehicle and the like, and controls the braking intervention at the individual wheels so that the dynamic stability of the vehicle is retained e.g., when cornering or in the case of different skid resistance of the roadway on the right and left side of the vehicle, and therefore the vehicle is prevented from skidding. Each of the two regulating devices, ABS and ESP, is assigned a monitoring module 16 which constantly checks whether the regulating device in question is switched on and in working order.

Also represented symbolically in FIG. 1 is a data acquisition system 18 which acquires vehicle data regarding driving dynamics, e.g., vehicle speed V. As an example, the data acquisition system 18 is also able to ascertain coefficient of friction $\mu$ of the roadway or at least an estimate for it (averaged over all vehicle wheels).

The exceptional feature of the system shown here is that braking demand a is not transmitted directly to braking unit 12, but rather to a control unit 20 which also receives information from monitoring modules 16 and data acquisition system 18, and based on this information, converts braking demand a into a modified braking demand a', which is then passed on to braking unit 12. Monitoring modules 16 signal to control unit 20 whether the specific regulating device (ABS or ESP) is switched on and functional, or whether it is switched off or defective. If desired, detailed information about the type of defect and the extent of operativeness of the regulating device may also be communicated. Control unit 20 receives information about coefficient of friction $\mu$ and, e.g., about vehicle speed V from data acquisition system 18.

In the example shown in FIG. 1, control unit 20 is integrated into triggering unit 10, as indicated by a dashed-line frame 22.

Figure 2:
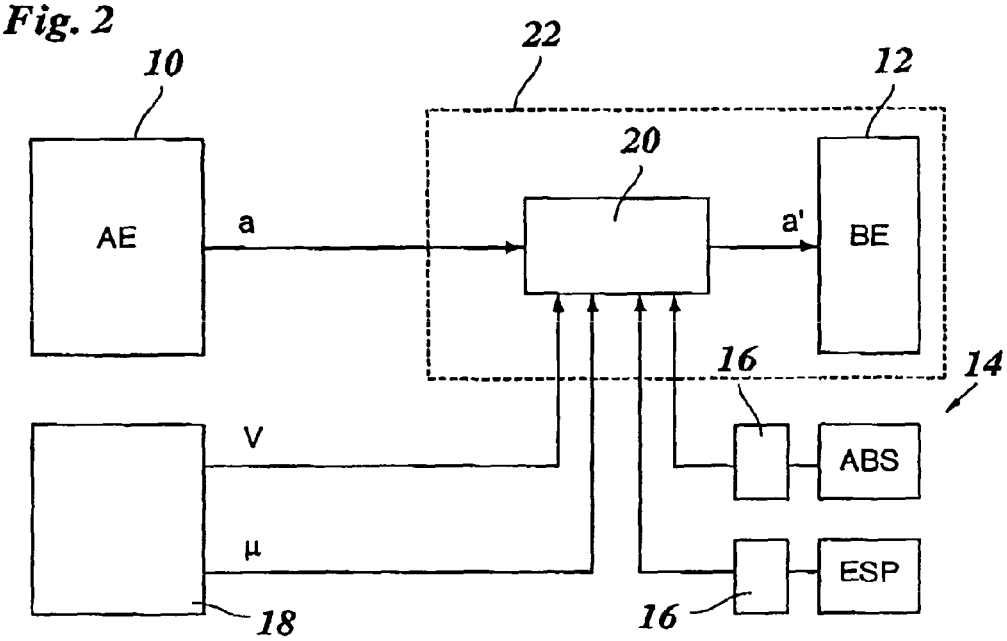

FIG. 2 shows another exemplary embodiment, in which control unit 20 is integrated into braking unit 12.

Figures 3, 4:
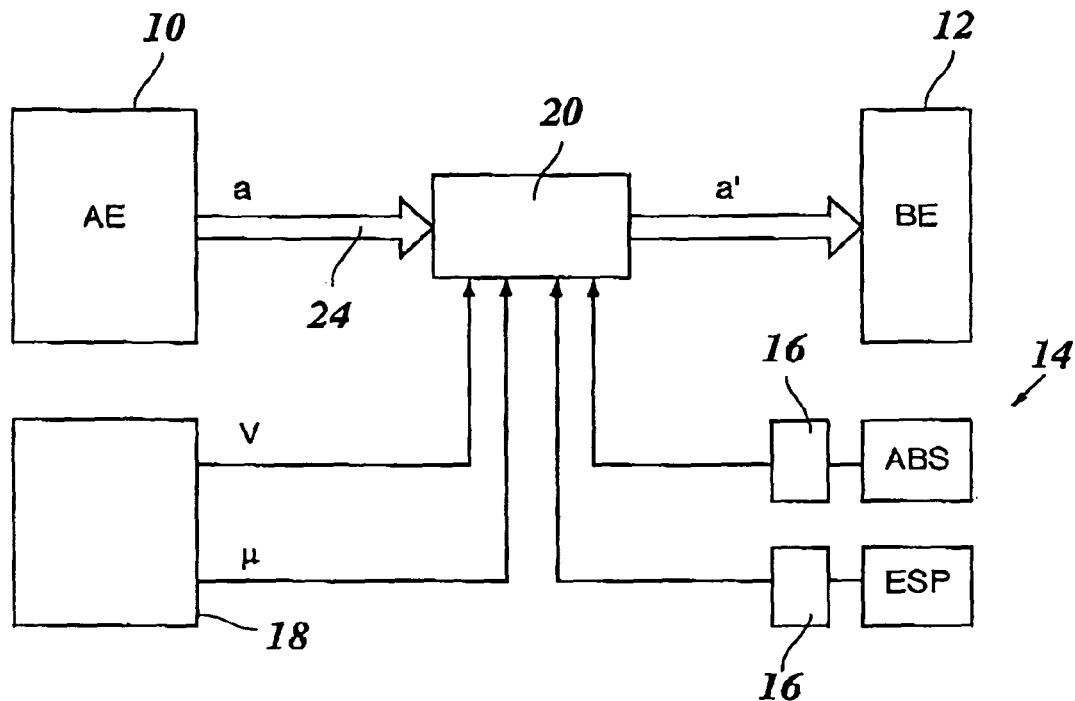
FIG. 4 shows a table for explaining the functioning method of the brake control system.

FIG. 3 shows a further exemplary embodiment, in which control unit 20 is configured as a separate unit that communicates with triggering unit 10 and braking unit 12 via a communication device 24, for instance, a data bus (e.g., CAN bus). It is equally conceivable for control unit 20 to communicate only with triggering unit 10 or only with braking unit 12, and in each case to signal modified braking demand a' back to this unit. Communication with the remaining components of the system may also take place via the data bus.

FIG. 4 shows, in table form, an example of the functioning method of control unit 20. An entry "1" in first column "ABS" signifies that the anti-lock braking system is switched on and in working order. An entry "0" in this column means that the anti-lock braking system is either switched off or is defective. The equivalent holds true for the entries in second column "ESP" for the electronic stability program. An entry "1" in third column "$\mu$" signifies that information about coefficient of friction $\mu$ of the roadway is available. An entry "NN" means here that this information is not available. An entry "–" in column "$\mu$" means that information with regard to coefficient of friction $\mu$ does not matter. How braking demand a is modified by control unit 20 is indicated in fourth column "a'".

If both the ABS and the ESP are functional, braking demand a is relayed unaltered to braking unit 12 (a'=a). If at least one of the regulating devices ABS and ESP is switched off or is defective and no information is available about coefficient of friction $\mu$, braking demand a is suppressed (a'=0). In this way, in the cases when stability system 14 is unable to ensure the dynamic stability of the vehicle, triggering unit 10 is prevented from triggering a braking action. As an example, a warning signal (e.g., a visual or acoustical signal) is additionally output to the driver to inform him/her that the functions of the triggering unit or of the associated assistance system are not available, or are not available to the full extent.

If at least one of the regulating devices ABS and ESP is switched off or defective, but information about coefficient of friction $\mu$ is available, then braking demand a is only passed on unaltered to braking unit 12 if this braking demand is less than a specific limiting value (alim1 ($\mu$), alim2 ($\mu$) or alim3 ($\mu$)), which is a function of coefficient of friction $\mu$. If a is greater than this limiting value, only the limiting value in question is passed on as modified braking demand a' to-braking unit 12 (a'=min(a, alim1 ($\mu$)), etc.). In this context, the limiting values may be a function of the type and number of defects determined, and are selected in such a way that driving stability can be ensured in spite of the limited functionality of stability system 14. Optionally, the limiting values may also be a function of further variables regarding driving dynamics, e.g., vehicle speed V, or the modification may be a more complex function of variables a, $\mu$ and the remaining driving-dynamics variables. In this way, an optimal compromise between driving stability and the extent of functionality of the assistance system is ensured in every situation.

What is claimed is:

1. A brake control system for a motor vehicle, comprising:
a stability system for providing driving dynamics stability for the motor vehicle during braking;
a triggering unit for automatically outputting a braking demand signal for automatic braking as a function of traffic situation, wherein the braking demand signal represents a target braking force, and wherein the triggering unit is distinct from the stability system;
a control unit which automatically modifies the braking demand signal, prior to implementation of an automatic braking action, whenever the stability system is not completely functional, wherein the control unit is distinct from the stability system;
a braking unit which implements the automatic braking action based on the modified braking demand signal; and
a data acquisition system for one of measuring and estimating a coefficient of friction of a roadway on which the motor vehicle is traveling;
wherein, whenever the stability system is not completely functional, the modification of the braking demand signal by the control unit results in: (a) limiting of the intensity of the braking action to a value dependent on the coefficient of friction of the roadway, if information about the coefficient of friction is available to the control unit; and (b) complete suppression of the braking demand signal to cause complete suppression of the automatic braking action, if information about the coefficient of friction is not available to the control unit.

2. The brake control system as recited in claim 1, wherein the control unit is integrated with the triggering unit.

3. The brake control system as recited in claim 1, wherein the control unit is integrated with the braking unit.

4. The brake control system as recited in claim 1, wherein the control unit is operatively connected to at least one of the triggering unit and the braking unit via a communication device.

5. A brake control system for a motor vehicle, comprising:
a stability system for providing driving dynamics stability for the motor vehicle during braking;
a triggering unit for automatically outputting a braking demand signal for automatic braking as a function of traffic situation, wherein the braking demand signal represents a target braking force, and wherein the triggering unit is distinct from the stability system;
a control unit which automatically modifies the braking demand signal, prior to implementation of an automatic braking action, whenever the stability system is not completely functional, wherein the control unit is distinct from the stability system; and
a braking unit which implements the automatic braking action based on the modified braking demand signal;

wherein, whenever the stability system is not completely functional, the modification of the braking demand signal by the control unit results in complete suppression of the braking demand signal to cause complete suppression of the automatic braking action.

* * * * *